United States Patent [19]

Häussler et al.

[11] Patent Number: 5,550,804
[45] Date of Patent: Aug. 27, 1996

[54] DATA BUS SYSTEM

[75] Inventors: Bernd Häussler, Ostfildern; Benno Meyer, Salem; German Münk, Friedrichshafen, all of Germany

[73] Assignees: Temic Telefunken Microelectronic GmbH, Heilbronn; Mercedes Benz AG, Stuttgart, both of Germany

[21] Appl. No.: 351,486

[22] Filed: Dec. 7, 1994

[30] Foreign Application Priority Data

Dec. 9, 1993 [DE] Germany .......................... 43 42 036.2

[51] Int. Cl.$^6$ ................................................. H04J 1/16
[52] U.S. Cl. ................................................. 370/16
[58] Field of Search ........................... 370/16, 13, 85 A,
370/85.1, 85.11; 371/8.1, 8.2, 11.1, 1.2;
326/90, 14, 19, 22, 26, 30; 363/134, 17,
37; 315/105; 178/19, 18; 381/121; 330/271,
274; 395/200, 181, 182.01, 183.01, 185.09;
340/827, 310.06, 941, 825.5; 375/200, 257,
219

[56] References Cited

U.S. PATENT DOCUMENTS 5,220,211  6/1993  Christopher et al. .................. 370/85.1

Primary Examiner—Douglas W. Olms
Assistant Examiner—Dang Ton
Attorney, Agent, or Firm—Spencer & Frank

[57] ABSTRACT

A data bus system including a serial data bus operated with complementary logic signals, several system users, communicating with each other via the bus lines of the data bus, and several output stages complete with a transmitter and a receiver, where each system user is assigned an output stage for coupling to the data bus. The output stage of each system user features a terminating network, with the determining network of at least on output stage being low impedance, active, switching, and internally switchable, with the terminating network of at least one more output stage being passive and low impedance, and with the terminating networks of all other output stages being passive and high impedance.

9 Claims, 2 Drawing Sheets

DATA BUS SYSTEM

DESCRIPTION OF THE PRIOR ART

In a data bus system, the various system users (receivers) connected to a given data bus (bus lines) will be able to communicate with each other or exchange data. One possible mode of communication consists of serial and bi-directional transmission of the data on the data bus, by means of differential signals (i.e. via bus lines featuring logic levels which are complementary to one another). One such bus system is, for instance, the CAN bus system mainly used in vehicle engineering; this bus system features two bus lines and is used for linking several system users in the low speed range (data transfer rate 125 kBd maximum).

Each data bus system user must be coupled to the data bus (bus lines) via an output stage. This output stage is comprised of partial circuits transmitter (transmitter stage) and receiver (receiver network): the transmitter stage connected to a system user's outputs or output lines serves to transmit this user's data and comprises an active complementary transistor circuit; the receiver network connected to a system user's inputs or input lines enables this user to receive data and comprises a passive resistor network. In addition, the output stage of one of these system users always has a (bus) terminating network: this low impedance terminating network sets the conditions for data bus traffic as well as bus line voltage levels; it is implemented as a passive circuit and thus always activated.

Such data bus systems, however, have the following disadvantages:

- whenever a fault or defect condition (such as open lines, short circuits etc.) occurs, data transmission between system users will still be possible but as such transmissions have a very low signal-to-interference ratio they will be very prone to interference
- in the event of a terminating network or the system user to whom this terminating network has been assigned suffering a failure, data transmission will no longer be possible
- in sleep mode, there is a high standby current input.

SUMMARY OF THE INVENTION

The invention is based on the task of providing a data bus system which avoids the above-mentioned disadvantages and features advantageous characteristics even when data are transmitted under fault conditions.

This task is solved by a serial data bus operated with complementary logic signals, a plurality system users communicating with each other via the bus lines of the data bus, and a plurality of output stages each having a transmitter and a receiver, with each system user being assigned an output stage for coupling to the data bus; and wherein each output stage of a data bus system user is assigned a terminating network with the characteristics of the terminating network being chosen such that (preferably) at least one output stage features a low impedance, active, switching, and internally switchable terminating networks, such that the passive terminating networks of the other output stages (preferably) at least one is implemented as low impedance and all other terminating networks are to be high impedance. System user output stages (receiver, transmitter, terminating network) will be implemented such that it will be possible to detect faults in the data bus system and that even under fault conditions data can be transmitted with a very high signal-to-interference ratio: the receiver resistor network will be modified such that, if a fault occurs on a bus line, it will initially not be possible to continue transmitting data; this condition will be detected, and after determining which bus line is faulty, data transmission will be carded out on the other bus line (which is intact).

The data bus system presented here features advantageous characteristics described below by distributing its terminating network across all output stages, by implementing terminating networks as described above, as well as by implementing transmitter and receiver designs as stated above:

- the "active" part of the terminating network will be switched off in sleep mode, thus achieving minimum standby current input
- the "low impedance part" of the terminating network will be distributed across at least two system users (redundancy), so that even in the event of one of the low impedance terminating networks or one of the associated system users failing, data transmission will still be possible; if such an event occurs, a level shift will be implemented due to the way the switching component in the output stage is dimensioned; this will ensure a sufficiently high signal-to-interference ratio during data transmission
- it will be possible to detect many different types of data bus faults (short circuit of one data bus line against reference potential or supply voltage, bus lines short-circuiting against each other, open line condition in one line)
- in the event of a fault occurring, internal switching of the active terminating network will allow the complementary bus line, which will be non-affected by any faults, to be activated for data transmission (single line mode); in such a case, switch-over of the active terminating network will alter receive levels such that a large (sufficient) signal-to-interference ratio exists during data transmission
- data transmission in two-line mode will either be possible by using conventional voltage levels (3.25 V/1.75 V logical "1", 1 V/4 V logical "0") for standard operation, or by using altered voltage levels (5 V/0 V logical "1"; 1.2 V/3.8 V logical "0") for wake-up following sleep mode as well as for redundancy operation (in the event of a low impedance terminating network failure)
- in the event of the data bus system comprising more than two low impedance terminating networks—with preferably only two of these being simultaneously active at any time—, and on failure of one of the currently active low impedance terminating networks (or its associated system user), the failed terminating network may be replaced by activating one of the non-active low impedance networks and its function taken over by this newly activated terminating network.

BRIEF DESCRIPTION OF THE DRAWINGS

This invention is to be further elucidated by means of an implementation example illustrated in the drawing, i.e., a data bus system featuring a data bus complete with two bus lines.

DESCRIPTION OF A PREFERRED EMBODIMENT

Figure 1:
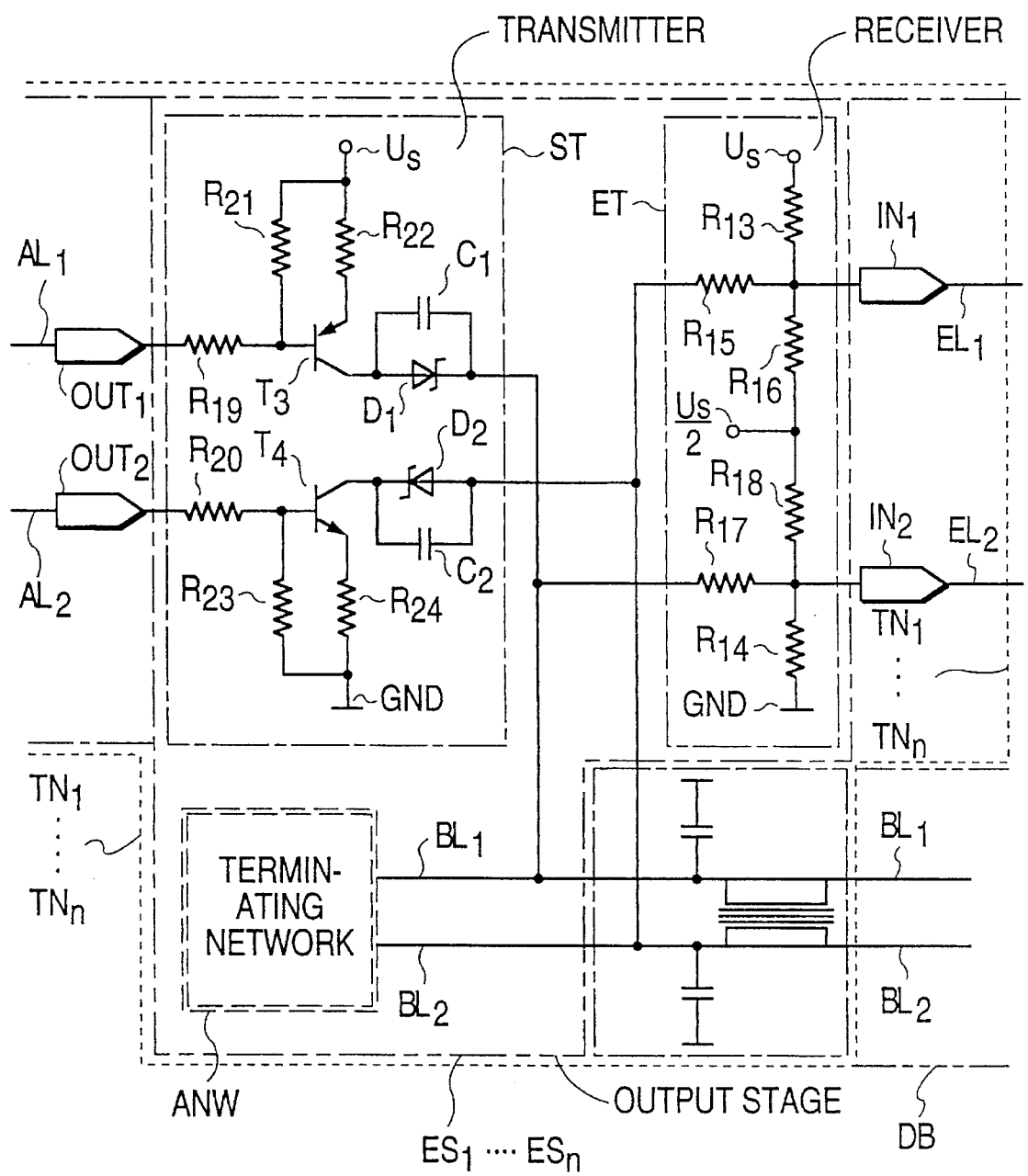
FIG. 1 shows the output stage of a data bus system user.

Output stages $ES_1 \ldots ES_n$ serve to couple system users $TN_1 \ldots Tn_n$ to data bus DB (bus lines $BL_1$, $BL_2$) of the data bus system. As shown in FIG. 1, each output stage $ES_1 \ldots ES_n$ comprises a receiver ET which is connected via input lines $EL_1$, $EL_2$ with its associated system user $TN_1 \ldots TN_n$, a transmitter ST which is connected via output lines $AL_1$, $AL_2$ with its associated system user $TN_1 \ldots TN_n$, as well as a terminating network $ANW_1 \ldots ANW_n$.

a) Transmitter ST:

Via outputs $OUT_1$, $OUT_2$ connected to output lines $AL_1$, $AL_2$, system user $TN_1 \ldots TN_n$ will trigger transmitter ST; with driver transistors $T_3$, $T_4$ switched through, transmitter ST will then set (dominant) voltage levels assigned to a logical "0" to data bus DB. Emitter resistors $R_{22}$ and $R_{24}$ form a negative current feedback by which, in the event of a bus line $BL_1$, $BL_2$ short-circuiting to reference potential (supply voltage $U_s$, ground GND), the current will be limited to a set maximum current by driver transistors $T_1$, $T_2$ (therefore no transistors, higher capacity resistors or other components will be necessary for short-circuit protection).

b) Receiver ET

By means of receiver ET, voltage levels on the data bus DB will be linearly converted, using a set direct current transmission factor (e.g., 4.65), to such voltage levels as are within the common mode range of the receiver comparator—connected via input lines $EL_1$, $EL_2$ to the two inputs $IN_1$, $IN_2$—of the associated system user $TN_1 \ldots TN_n$. The receiver network comprises resistors $R_{15}$ to $R_{18}$, as well as resistor $R_{13}$, connected to supply voltage $U_s$, and resistor $R_{14}$ connected to reference potential (ground GND). The (complementary) input voltage at inputs $IN_1$, $IN_2$ will either be 0 V or 5 V; the resulting bus voltage (voltage on bus lines $BL_1$, $BL_2$) will be set via terminating networks and transmitter ST (driver transistors $T_3$, $T_4$, diodes $D_1$, $D_2$, emitter resistors $R_{22}$, $R_{24}$). The voltage at the receiver comparator of system user $TN_1 \ldots TN_n$ will be the bus voltage divided down by the transmission factor (e.g., 4.65). Thus, when operating in two-line mode, a fault on the data bus DB (short circuit of a bus line $BL_1$, $BL_2$ against ground GND or supply voltage $U_s$, break of a bus line $BL_1$, $BL_2$, or bus lines $BL_1$, $BL_2$ short-circuiting against each other) will cause the voltage level on the defective bus line $BL_1$ or $BL_2$ to deviate significantly from the voltage level on the non-defective bus line $BL_1$ or $BL_2$. In the event of a fault therefore, it will initially not be possible to continue receiving data. This will be the criteria used for fault detection. Data transmission will then be resumed in single line mode on non-defective bus line $BL_1$ or $BL_2$.

c) Terminating network $ANW_1 \ldots ANW_n$

Figure 2:
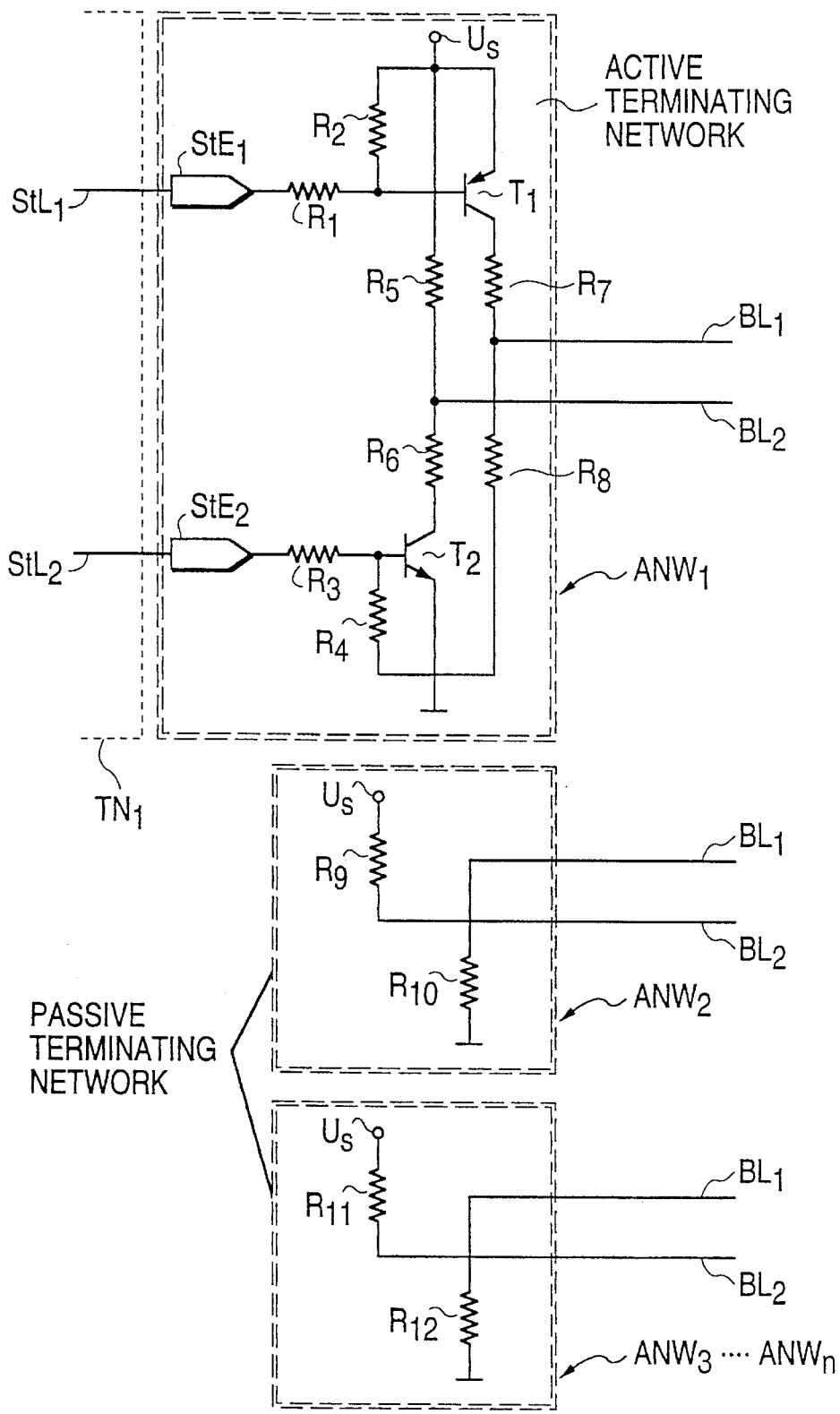
FIG. 2 shows detail circuit diagram of the terminating networks in respect of the various users of this data bus system.

By means of the data bus system terminating network, (recessive) voltage levels on the data bus, assigned to a logical "1", will be generated. As illustrated by FIG. 2, this network will be configured such that each system user $TN_1 \ldots TN_n$ will be assigned a terminating network $ANW_1 \ldots ANW_n$, that is, each output stage $ES_1 \ldots EN_n$ comprises a terminating network $ANW_1 \ldots ANW_n$; one output stage $ES_1$ will be given a low impedance (resistors $R_1$, $R_3$: e.g. 10 k$\Omega$; $R_2$, $R_4$: e.g. 8.2 k$\Omega$; $R_5$, $R_8$: e.g. 2.4 k$\Omega$; $R_6$, $R_7$: e.g. 2.2 k$\Omega$), active, switching (transistors $T_1$, $T_2$) and internally switchable terminating network $ANW_1$; the other output stages $ES_2 \ldots ES_n$ will have passive terminating networks, of which terminating network $ANW_2$ of output stage $ES_2$ will be low impedance (resistors $R_9$, $R_{10}$: e.g. 2.4 k$\Omega$), and terminating networks $ANW_3 \ldots ANW_n$ of the remaining output stages $ES_3 \ldots ES_n$—these serve to define the potential in respect of each system users' receiver— will be high impedance (resistors $R_{11}$, $R_{12}$: e.g., 100 k$\Omega$).

In the various bus states, output stages—terminating networks in particular—will have the following function:

a) Sleep mode

The "active" terminating network $ANW_1$ will be triggered by system user $TN_1$ via trigger inputs $StE_1$, $StE_2$ such that both transistors $T_1$ and $T_2$ will be turned off, that is, voltage levels on the data bus will be 5 V (Low level) and 0 V (High level). This causes standby current input to be minimal.

b) Wake-up

If one of the system users TN is externally activated (that is, this system user is not woken up via the data bus), this system user will pass a wake-up signal—via the data bus DB—to all other system users. Although the active terminating network $ANW_1$ is still in a deactivated state, it will already be possible for data transmission to take place.

c) Normal mode

After system user $TN_1$, together with the terminating network $ANW_1$ assigned to this system user $TN_1$, has been woken up (simultaneously, the other system users $TN_2 \ldots TN_n$ of the data bus system will also be woken up), the active terminating network $ANW_1$ will be switched on via trigger lines $StL_1$, $StL_2$ of system user 1. By means of the two voltage dividers (resistors $R_5$, $R_6$, and $R_7$, $R_8$) of active terminating network $ANW_1$ and the two resistors $R_9$, $R_{10}$ of the low impedance passive terminating network $ANW_2$, the recessive voltage levels on the data bus will be generated (for instance, High level: 3.25 V, and Low level: 1.75 V). In connection with driver transistors $T_3$, $T_4$ of transmitter stages ST, the dominant voltage levels on the data bus will also be set (for instance, Low level: 1 V, and High level: 4 V). These standard voltage levels will be applied to the data bus until the next transition into sleep mode, or a fault condition, occurs.

d) Fault Condition

Bus fault: using a search algorithm, faults will be detected, fault types characterized and the affected bus line identified; data transmission will then be carried out on the non-defective bus line, that is, there is a transition to single line mode.

Outputs $OUT_1$ or $OUT_2$ of system users $TN_1 \ldots TN_n$, connected to whatever bus line is defective, will switch to high impedance and the relevant input $IN_1$ or $IN_2$ of system user $TN_1 \ldots TN_n$ to the internal reference voltage (for instance, $\frac{1}{2} \cdot U_s = 2.5$ V). In addition, in the active terminating network $ANW_1$, transistor $T_1$ or $T_2$ triggering non-defective bus line $BL_1$ or $BL_2$ will be turned off (this is necessary as otherwise, when bus lines $BL_1$, $BL_2$ short-circuit to each other, the signal-to-interference ratio at the system user's receiver comparator inputs would be too small).

Failure of system user $TN_1$ or $TN_2$: as, for redundancy reasons, the low impedance part of the terminating network has been distributed to two system users $TN_1$, $TN_2$, even in the event of a system user $TN_1$ or $TN_2$ failure data transmission will still be possible due to the existing second low impedance terminating network $ANW_2$ or $ANW_1$.

Line breaks: line break detection (open line condition) will be effected by detecting data communication faults (missing check messages).

When transmitting data under fault conditions, there will never be standard voltage levels on the data bus.

To set these various operating modes or states of the data bus, outputs $OUT_1$, $OUT_2$ of system users $TN_1 \ldots TN_2$ connected to driver transistors $T_3$, $T_4$ of transmitter stage ST, as well as trigger inputs $StE_1$, $StE_2$ connected to transistors $T_1$, $T_2$ of the active terminating network $ANW_1$, must be activated or deactivated in a particular fashion.

What is claimed is:

1. Data bus system comprised of:

a) a serial data bus (DB) operated with complementary logic signals, b) several system users ($TN_1 \ldots Tn_n$), communicating with each other via the bus lines ($BL_1, BL_2$) of the data bus (DB), c) several output stages ($ES_1 \ldots Es_n$) each having a transmitter (ST) and a receiver (ET), with each system user ($TN_1 \ldots Tn_n$) being assigned an output stage (ES1 ... Esn) for coupling to the data bus (DB), and wherein, d) the output stage ($ES_1 \ldots Es_n$) of each system user ($TN_1 \ldots Tn_n$) includes a respective terminating network ($ANW_1 \ldots ANW_2$) coupled to the bus lines (BL1, BL2), e) the terminating network (ANW1) of at least one output stage ($ES_1$) is low impedance, active, and internally switchable from one impedance value present on the bus lines to another impedance value present on the bus lines, f) the terminating network ($ANW_3 \ldots ANW_n$) of at least one more output stage ($ES_2$) is passive and of low impedance, g) the terminating networks ($ANW_3 \ldots ANW_n$) of all other output stages ($ES_3$) $\ldots ES_n$) are passive and of high impedance.

2. Data bus system in accordance with claim 1 wherein the active terminating network ($ANW_1$) has two trigger inputs ($StE_1$, $StE_2$) which are connected to the associated system user (TN1) via two trigger lines ($StL_1$, $StL_2$), and bus lines (BL1, BL2) which are activated or deactivated by trigger signals on the trigger lines ($StL_1$, $StL_2$).

3. Data bus system in accordance with claim 2 wherein the active terminating network ($ANW_1$) has two switching elements ($T_1$, $T_2$) whose outputs are respectively connected to one bus line each ($BL_1$, $BL_2$) and whose inputs are the respective trigger inputs.

4. Data bus system in accordance with claim 3 wherein the two switching elements ($T_1$, $T_2$) are complementary bipolar transistors.

5. Data bus system in accordance with claim 1 wherein the low impedance terminating networks each include a plurality of resistors, and voltage levels on the data bus (DB) are set by selecting the resistors ($R_1 \ldots R_{10}$) of the low impedance terminating networks ($ANW_1$, $ANW_2$).

6. Data bus system in accordance with claim 1 wherein the output stages ($ES_1 \ldots ES_n$) of system users ($TN_1 \ldots TN_n$) are implemented such that faults on bus lines ($BL_1$, $BL_2$) of the data bus (DB) are detected.

7. Data bus system in accordance with claim 6 wherein one input ($IN_1$) of the receiver (ET) of each output stage ($ES_1 \ldots ES_n$) is connected to a supply voltage ($U_s$) via a resistor ($R_{13}$), and the other input ($IN_2$) is connected to reference potential (GND) via a further resistor ($R_{14}$).

8. Data bus system in accordance with claims 6 or 7 wherein the receiver of each output stage has two inputs connected respectively to the data lines, and the two inputs ($IN_1$, $IN_2$) of the receiver (ET) of each output stage ($ES_1 \ldots ES_n$) are connected to each other via two resistors ($R_{16}$, $R_{18}$), and the common connection of these two resistors ($R_{16}$, $R_{18}$) is connected to an internal reference voltage.

9. Data bus system in accordance with claim 8 wherein the internal reference voltage (½ $U_s$) is half the supply voltage ($U_s$).

* * * * *